United States Patent
Graube et al.

(10) Patent No.: US 12,375,558 B2
(45) Date of Patent: Jul. 29, 2025

(54) ROLE SWITCHING IN A MESH NETWORK USING PERIODIC ADVERTISEMENT

(71) Applicant: QUALCOMM Incorporated, San Diego, CA (US)

(72) Inventors: Nicolas Graube, Cambridge (GB); Robin Robin, Noida (IN); Deep Shikha Aggarwal, Gurugram (IN); Sonu Lnu, Faridabad (IN); Randhir Kumar, New Delhi (IN); Paul Dominic Hiscock, Cambridge (GB); Mauro Scagnol, Great Cambourne (GB); Tingting Liu, Cambridge (GB); Rahul Sangwan, Charkhi Dadri (IN)

(73) Assignee: QUALCOMM Incorporated, San Diego, CA (US)

(*) Notice: Subject to any disclaimer, the term of this patent is extended or adjusted under 35 U.S.C. 154(b) by 456 days.

(21) Appl. No.: 17/930,210

(22) Filed: Sep. 7, 2022

(65) Prior Publication Data
US 2024/0080880 A1  Mar. 7, 2024

(51) Int. Cl.
*H04L 67/104* (2022.01)
*H04W 8/00* (2009.01)
(Continued)

(52) U.S. Cl.
CPC ......... *H04L 67/1051* (2013.01); *H04W 8/005* (2013.01); *H04W 28/021* (2013.01); *H04W 84/20* (2013.01)

(58) Field of Classification Search
CPC .. H04L 67/12; H04L 67/1051; H04W 28/021; H04W 84/18–22
See application file for complete search history.

(56) References Cited

U.S. PATENT DOCUMENTS

| 8,856,310 B2 * | 10/2014 | Norden | G06F 15/173 |
| | | | 709/224 |
| 2004/0255001 A1 * | 12/2004 | Oh | H04W 56/0015 |
| | | | 709/248 |

(Continued)

FOREIGN PATENT DOCUMENTS

| CN | 113438634 A | 9/2021 |
| WO | 2021050633 A1 | 3/2021 |

OTHER PUBLICATIONS

Trifunovic, Sacha, et al. "Adaptive role switching for fair and efficient battery usage in device-to-device communication." ACM SIGMOBILE Mobile Computing and Communications Review 18.1 (2014): 25-36. (Year: 2014).*

(Continued)

*Primary Examiner* — Brendan Y Higa
(74) *Attorney, Agent, or Firm* — Muncy, Geissler, Olds & Lowe, P.C.

(57) ABSTRACT

Various embodiments include methods for rotating a control node role among devices in a control cluster of a wireless mesh network. Methods may include assuming the control node role by a first device based on a control node assumption timing in a schedule, and transmitting periodic messages to support the wireless mesh network. Methods may further include using the schedule to identify a control node role end timing and a third device in the control cluster that will assume the control node role, transmitting the periodic messages while monitoring for an extended advertisement from the third device after the control node role end timing until the extended advertisement from the third device is received, and assuming a passive node role upon receiving the extended advertisement from the third device or continuing the control node role when no extended advertisement is received from the third device.

17 Claims, 10 Drawing Sheets

(51) Int. Cl.
*H04W 28/02* (2009.01)
*H04W 84/20* (2009.01)

(56) References Cited

U.S. PATENT DOCUMENTS

| | | | | |
|---|---|---|---|---|
| 2008/0080425 | A1* | 4/2008 | Lee | H04W 36/12 370/331 |
| 2008/0112364 | A1* | 5/2008 | Kwon | H04W 84/20 370/331 |
| 2009/0257403 | A1* | 10/2009 | Jeon | H04W 36/12 370/331 |
| 2011/0164595 | A1* | 7/2011 | So | H04W 12/06 370/338 |
| 2013/0132500 | A1* | 5/2013 | Vandwalle | H04L 67/1051 709/208 |
| 2013/0183900 | A1* | 7/2013 | Lee | H04W 84/20 455/41.2 |
| 2017/0303090 | A1 | 10/2017 | Stitt et al. | |
| 2017/0374629 | A1 | 12/2017 | Ramappa et al. | |
| 2018/0270643 | A1 | 9/2018 | Baker et al. | |
| 2019/0069215 | A1 | 2/2019 | Abouelseoud et al. | |
| 2020/0252993 | A1 | 8/2020 | Srivastava et al. | |
| 2022/0078607 | A1* | 3/2022 | Link | H04W 12/03 |
| 2022/0124626 | A1 | 4/2022 | Weizman et al. | |

OTHER PUBLICATIONS

Chatterjee B., et al., "Context-Aware Collaborative-Intelligence with Spatio-Temporal In-Sensor-Analytics for Efficient Communication in a Large-Area IoT Testbed", arXiv:2005.13003v1 [cs.NI] May 26, 2020, 16 Pages.

International Search Report and Written Opinion—PCT/US2023/026415—ISA/EPO—Oct. 17, 2023 16 pages.

* cited by examiner

ROLE SWITCHING IN A MESH NETWORK USING PERIODIC ADVERTISEMENT

BACKGROUND

Internet-of-Things (IOT) devices may communicate with each other and a network access point (AP) using an energy-efficient, short range wireless communication protocol such as Bluetooth Low Energy (BLE). An IOT device may broadcast periodic advertisement (PA) messages at regular intervals to a nearby mesh network of a collection of IOT devices. Such PA messages may serve as synchronization signals and may enable responses in assigned periods from network devices.

SUMMARY

Various aspects include systems and methods performed by a processor for rotating a control node role among devices in a control cluster of a wireless mesh network, including identifying a control node assumption timing in a schedule stored on a first device within the control cluster, the control node assumption timing defining when the first device is scheduled to assume the control node role for the wireless mesh network from a second device of the control cluster, and assuming the control node role by the first device based on the control node assumption timing in the schedule, the control node role including transmitting periodic messages to support the wireless mesh network.

Some aspects may further include identifying a control node role end timing in the schedule stored on the first device, identifying a third device in the control cluster that will assume the control node role based on the schedule, monitoring for an extended advertisement from the third device after the control node role end timing indicating that the third device has assumed the control node role, transmitting the periodic messages after the control node role end timing until the extended advertisement from the third device is received, and assuming a passive node role of listening for periodic messages from the third device after the control node role end timing upon receiving the extended advertisement from the third device, or continuing the control node role when no extended advertisement is received from the third device.

In some aspects, continuing the control node role when no extended advertisement is received from the third device further may include identify a fourth device in the control cluster that will assume the control node role based on the schedule, adjusting the schedule to shift the control node assumption timing of the fourth device, requesting a premature transfer of the control node role, receiving an acknowledgement from the fourth device of the shift in the control node assumption timing, monitoring for a periodic advertisement from the fourth device after the acknowledgment indicating that the fourth device has assumed the control node role, and assuming the control node role of listening for periodic messages from the third device after the control node role end timing upon receiving the periodic advertisement from the fourth device.

In some aspects, continuing the control node role when no extended advertisement is received from the third device further may include continuing in the control node role until the schedule provides another device of the control cluster to assume the control node role.

Some aspects may further include receiving a plurality of attributes from devices during organization of the mesh network, identifying a plurality of devices within the mesh network suitable for the control cluster based on the received plurality of attributes, compiling the schedule for transfer of the control node role among the plurality of devices of the control cluster, storing the schedule in memory of the first device, and communicating the schedule to each of the plurality of devices of the control cluster for storage.

Some aspects may further include collaborating with one or more of the plurality devices of the control cluster to identify a sequence of the control node role allocation, in which the first device is a member of the control cluster, and in which at least two of the plurality of devices of the control cluster are identified in the schedule stored on the first device.

In some aspects, the plurality of attributes includes at least one attribute related to suitability for serving in the control cluster selected from a battery level, an expected battery life, a proximity to other devices of the cluster, a transceiver battery usage, or an operating power mode.

Some aspects may further include receiving one or more consensus inputs from the plurality of devices of the control cluster to define the schedule, the one or more consensus inputs relating to an order of transferring the control node role in the control cluster. Some aspects may further include transmitting, from the first device, a plurality of attributes to other devices in the control cluster.

Further aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

DETAILED DESCRIPTION

Figure 1A:
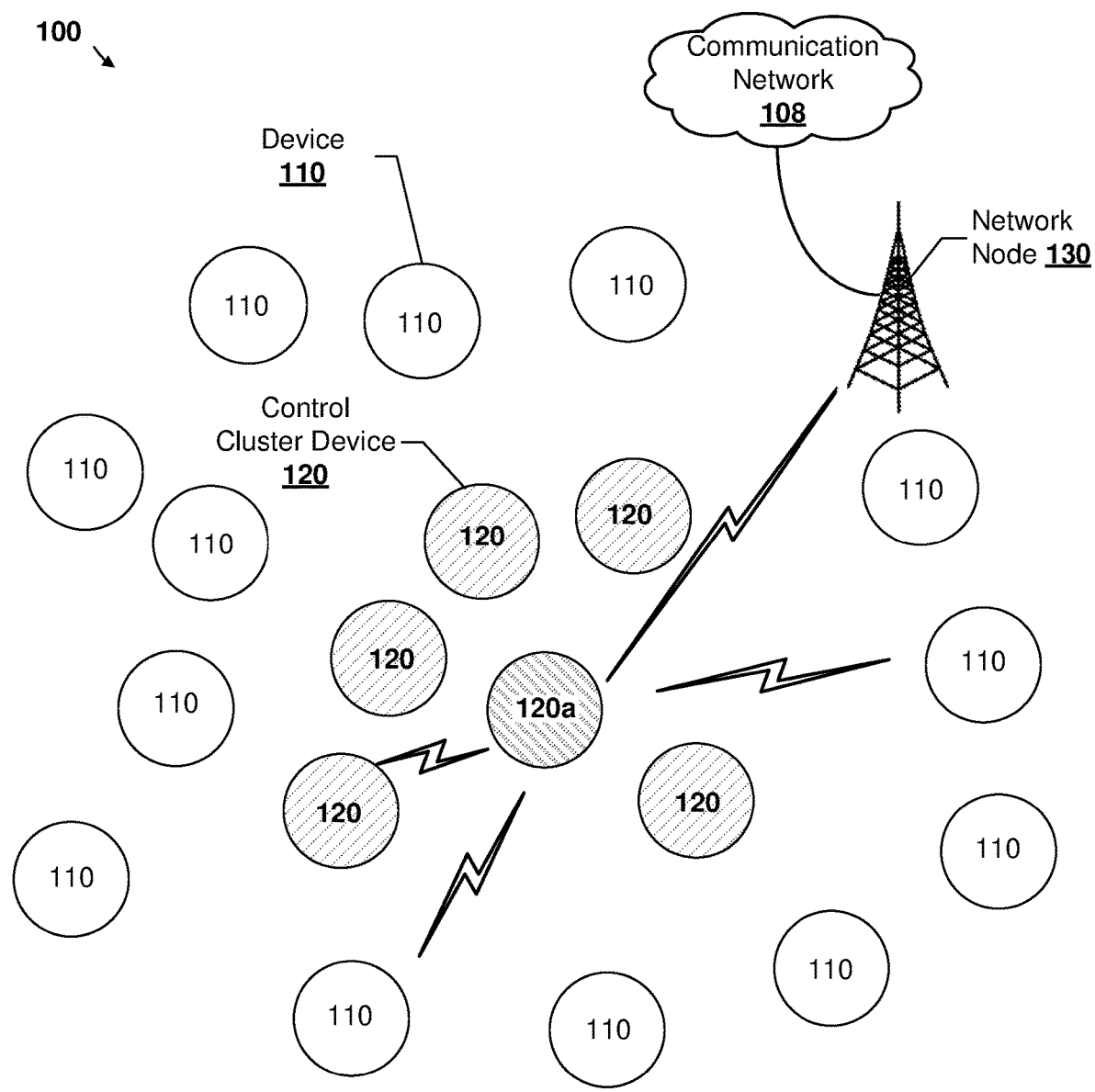
FIG. 1A is a system diagram illustrating an example communications system suitable for implementing any of the various aspects.

Various aspects and implementations will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments provide methods and system implementing the methods that support wireless mesh networks of BLE-capable IOT devices periodically shifting the role of the control node among a plurality of devices in a control cluster to average out the battery drain of functioning as the control node. Various embodiments include organizing such a mesh network, identifying the IOT devices in the control cluster, scheduling the sequence and periodicity of control node role shifting among the devices in the control cluster, and performing the process of shifting the control node role without interrupting mesh network services.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, virtual reality displays, extended reality displays, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA), frequency-hopping, spread spectrum, and other networks. In general, any number of wireless networks may be deployed in a given geographic area. Each wireless network may support at least one radio access technology, which may operate on one or more frequency or range of frequencies. In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. In another example, a frequency-hopping spread-spectrum network may implement Bluetooth (Bluetooth Special Interest Group) 5.0 and its variants, predecessors, and successors.

The internet-of-things (IOT) provides endless connection opportunities between devices and organizations of devices. IOT devices may connect to an access point which provides a high-powered reliable signal. Such access points may require constant power connections due to their high-power usage. IOT devices may connect via the Bluetooth low energy (BLE) mesh protocol/profile which allows for the creation of mesh networks. The organization of mesh networks based on legacy Bluetooth data channels may lead to channel congestion, interference, and unbounded delivery times.

IOT devices implementing BLE may transmit or receive regular transmissions called periodic advertisements that broadcast information from a control node to peripheral nodes. These periodic advertisements are unidirectional, which may prevent the use of such periodic advertisements in forming a mesh network. Periodic advertisements (PA) may be used to solicit reports from other IOT devices adding bi-directional communications capabilities without the need to establish a negotiated BLE link by requesting the receiving IOT device to transmit a response to a periodic advertisement. This communication method is referred to as PA with response (or PAwR). As a periodic advertisement can include an identifier of a particular IOT device, PAwR message exchanges can be directed to individual IOT devices. An IOT device receiving a PAwR may inspect the advertisement to detect whether it includes an identifier matching that of the IOT device, and if so, may transmit a response that responds to a query or information included in the payload of the PA depending on whether the received command seeks a response.

This directional query and response communication signaling without the need for negotiating BLE links between devices can be used to support the creation of a cooperative mesh network of BLE-capable IOT devices. In a wireless mesh network based on periodic advertising with response, one of the devices functions as a "control node" by sending the periodic advertisement messages according to a predefined schedule known to all other nodes in the mesh network (referred to as "peripheral nodes") and receiving corresponding responses from addressed peripheral nodes. The network may rely on the regular PA messages for synchronization to periodicity of those messages, as well as the timing for transmitting responses. Accordingly, the network may require a control node that is reliable and can reach the other nodes of the network with sufficient signal strength. While such a network may have many different applications, in a conventional mesh network of BLE-capable IOT devices the controlling device would need to receive power from an external source because the control node role will consume sufficient power that a battery-powered IOT performing the role would not be able to do so for long before draining its battery.

Various embodiments enable the deployment of wireless mesh networks of BLE-capable IOT devices in which the role of the control node is periodically shifted among a plurality of IOT devices in a control cluster, thereby evening out the battery drain of the devices functioning as the control node. Such a mesh network may be self-organizing, including identifying the IOT devices in the control cluster and scheduling the sequence and periodicity of performing the process of shifting the control node role from one node to the next may be performed without the need to establish a direct BLE communication link and without interrupting mesh network services.

The device that is functioning as the control node transmits periodic advertisement messages at regular intervals. Such messages may include data for the passive nodes in the network. Using the PAwR messaging option, the control node may send data or queries to particular peripheral nodes by including an identifier of the target node in the message payload, and an indication of the type of reply that should be transmitted in response. The periodic advertisement messages may serve to synchronize the devices in the mesh network, enabling peripheral devices to determine when to activate the radio receiver to receive periodic advertisement messages, as well as when to transmit a reply if appropriate. In this manner, the communications among the various nodes of the mesh network can be multiplexed in the time domain. The control node may listen at assigned intervals for responses and decide how to use the received information (e.g., relay or respond).

In various embodiments, the role of the control node is shifted or rotated to another device within the control cluster to distribute the power demands of supporting the mesh network among the control cluster. In various embodiments, this shifting or rotating of the control node role from one device to another may be accomplished according to a schedule that is known at least by the device performing the control node role, and in some embodiments known to all nodes in the control cluster. By shifting or rotating of the control node role according to a schedule, the role switching/rotating process can be accomplished among the control cluster devices without further information signaling between the devices (e.g., to exchange battery charge states). In some embodiments the schedule may be defined and stored in all devices within the control cluster, such as at the time the control cluster is organized. In some embodiments, the schedule may be known to and maintained by the device performing the control node role and communicated by the control node to the control cluster device that will take over the control node role next prior to when the control node role shift will occur. In some embodiments, the device performing the control node role may adjust the schedule and communicate the adjusted schedule to other devices in the control cluster.

Various embodiments enable the deployment of wireless mesh networks of battery-powered devices as the battery drain of functioning as the control node is shared among a group of devices. Various embodiments may be particularly useful for mesh networks organized around battery-operated IOT devices due to the self-organizing and role sharing methods that avoid any one device from having to function continuously as the control node.

FIG. 1A a system diagram illustrating an example communications system suitable for implementing a mesh network 100. As described, a mesh network may include a control node 120*a* that transmits to and receives messages from the various devices functioning as peripheral nodes 110, 120 in the mesh network. The control node 120*a* may also communicate with a network node 130 that is connected a communication network 108.

In various embodiments, the wireless mesh network 100 will include one or more devices that always function as peripheral node, which are referred to herein as "peripheral devices 110" or "peripheral nodes", and a group of devices that are configured to periodically function as the control node 120*a*, which are referred to herein a "control cluster devices" 120 or "control cluster nodes." In particular, the terms "control cluster devices" 120 or "control cluster nodes" refer to the devices in the control cluster that are not functioning as the control node (i.e., functioning as peripheral nodes), to distinguish from the one device in the control cluster that is functioning as the control node.

The peripheral devices 110 and the control cluster devices 120 may form a mesh network with communications synchronized by the control node 120*a*. The control node 120*a* may transmit periodic advertisements according to a periodicity that can serve as synchronization signals for the network while also transmitting data to the passive nodes in the mesh network. The control node 120*a* may communicate collaboratively or refer one or more decisions to the group of control cluster devices 120. Accordingly, the mesh network 100 may connect devices of various capabilities to each other and to various external assets.

The devices in the mesh network 100 may be synchronized to communicate via Bluetooth, Bluetooth Low Energy (BLE), or other Bluetooth standard messages. Bluetooth allocates most of its spectrum to data channels that may be used for device-to-device communication. Implementing a mesh network or a one-to-many network in these data channels can quickly flood these channels and quickly increase interference and delivery times. Bluetooth allocates a few slots on data channels to be used for periodic advertisements or broadcasts to devices in range. A Bluetooth device may broadcast a periodic advertisement with data and may connect two or more advertisements in a chain or train (e.g., if the data to be transmitted is too large for one advertisement). Other Bluetooth devices may activate their wireless transceiver when periodic advertisements are transmitted in order to receive such messages, while powering down the transceiver for the rest of the time. The nature of transmissions in the advertisement channels of the Bluetooth protocol are described in more detail with reference to FIG. 2.

A mesh network 100 may support bi-directional communications between all nodes of the mesh. That is, the advertisement channel and its managing protocol may enable responses from the peripheral devices 110. The devices 110 may be passive or active devices, where in the passive role, a device 110 may not be configured to respond and may only initiate a connection and listen (receive). For example, the devices 110 may be tags containing identifying information and programmable via Bluetooth transmission. The tags may conserve power by awakening only to receive periodic advertisements and awakening as instructed by the control node via advertisement. Other implementations are contemplated including industrial process control, distributed-processing clock synchronization, and other dis-aggregated device architectures.

The control cluster devices 120 may be configured with one or more properties or attributes that enable each device to perform the role of the control node 120a. The control cluster devices 120 may rotate or deterministically assign the role of the control node to each of the control cluster devices 120 according to a schedule that is stored in each of the control cluster devices. When it is time to assume the role of the control node 120a, a control cluster device 120 may begin transmitting periodic advertisements including data and information for reception by other control cluster devices 120 and peripheral devices 110. The mesh network 100 and the group of control cluster devices 120 may be managed entirely via the advertisement channels and without transmissions on legacy Bluetooth channels or Bluetooth data channels once the synchronization has been established. The mesh network 100 may be organized via another wired or wireless protocol that provides regularly broadcast packets to synchronize and inform a network.

In some implementations there may be more than one mesh network adjacent (in communication space) to one another, in which case the control node 120a may communicate with a control node of an adjacent mesh network directly or through relayed messages passed through the two mesh networks. One or more control cluster devices 120 or transmission-capable devices 110 may operate as wireless communication routers to other mesh networks.

The control node 120a may prioritize or schedule longer response times for control cluster devices 120 that form part of the decision-making apparatus and sensing infrastructure for the mesh network 100. For example, the control node 120a may periodically ask the control cluster devices 120 and peripheral devices 110 to provide signal strengths of neighbor devices 110. Additionally, the control node 120a may periodically ask the control cluster devices 120 and peripheral devices 110 to scan for nearby active control tags. The group of control cluster devices 120 and allocated communication times may ensure the reliability and self-repair capability of the mesh network 100.

As illustrated, the control node 120a may operate as a bridge to other networks (e.g., cellular networks, WLAN, Wi-Fi) via the network node 130 or the communication network 108. For example, the network node 130 and communication network 108 may be a cellular wireless wide area network (WWAN), such as a 5G or later generation wireless network. In particular, the network node 130 may be a 5G New Radio (NR) network node, a Wi-Fi access point, or any other suitable network such as a Long-Term Evolution (LTE) network or later generation network. Therefore, the reference to a 5G network and 5G network elements in the following descriptions is for illustrative purposes and is not intended to be limiting. The communication system 100 may be a heterogeneous network including peer-to-peer links, relay links, and one or more links to a network node (e.g., network node 130). The network node 130 may connect via a backhaul link or other network link to further assets. The various connections in a 5G radio system are described in more detail in FIG. 1B.

The network node 130 may connect to the communication network 108 via wired or wireless communication links (such as Ethernet, TV cable, telephony, fiber optic and other forms of physical network connections) and enable communications by the control node 120a with the backend servers via the communication network 108. The control node 120a may communicate with the network node 130 over a wireless communication link.

The communication network 108 may include a number of network nodes 130 and other network entities, such as base stations and access points. A network node 130 is an entity that communicates with user devices and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. In various communication network implementations or architectures, a network node may be implemented as an aggregated base station, as a disaggregated base station, an integrated access and backhaul (IAB) node, a relay node, a sidelink node, etc., such as a virtualized Radio Access Network (vRAN) or Open Radio Access Network (O-RAN). Also, in various communication network implementations or architectures, a network device (or network entity) may be implemented in an aggregated or monolithic base station architecture, or alternatively, in a disaggregated base station architecture, may include one or more of a Centralized Unit (CU), a Distributed Unit (DU), a Radio Unit (RU), a near-real time (RT) RAN intelligent controller (RIC), or a non-real time RIC. Each network device may provide communication coverage for a particular geographic area. In 3GPP, the term "cell" can refer to a coverage area of a network device, a network device subsystem serving this coverage area, or a combination thereof, depending on the context in which the term is used.

The wireless communication links of the communication network 108 and network node 130 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. The various nodes of the wireless mesh network 100 may use RATs of medium range protocols such as Wi-Fi, LTE-U, LTE-Direct, LAA, MuLTEfire, and relatively short-range RATs such as ZigBee, Bluetooth, and Bluetooth Low Energy (LE).

While descriptions of some implementations of the network node 130 and communication network 108 may use terminology and examples associated with LTE technologies, some implementations may be applicable to other wireless communications systems, such as a new radio (NR) or 5G network. NR may utilize orthogonal frequency-division multiplexing (OFDM) with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Deployment of wireless communication systems 108, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or components) performing base station functionality, may be implemented in an aggregated or disaggregated architecture. For example, a base station (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or as a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, DUs and RUs also can be implemented as virtual units, referred to as a virtual central unit (VCU), a virtual distributed unit (VDU), or a virtual radio unit (VRU).

Base station-type operations or network design may consider aggregation characteristics of base station functionality. For example, disaggregated base stations may be utilized in an integrated access backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
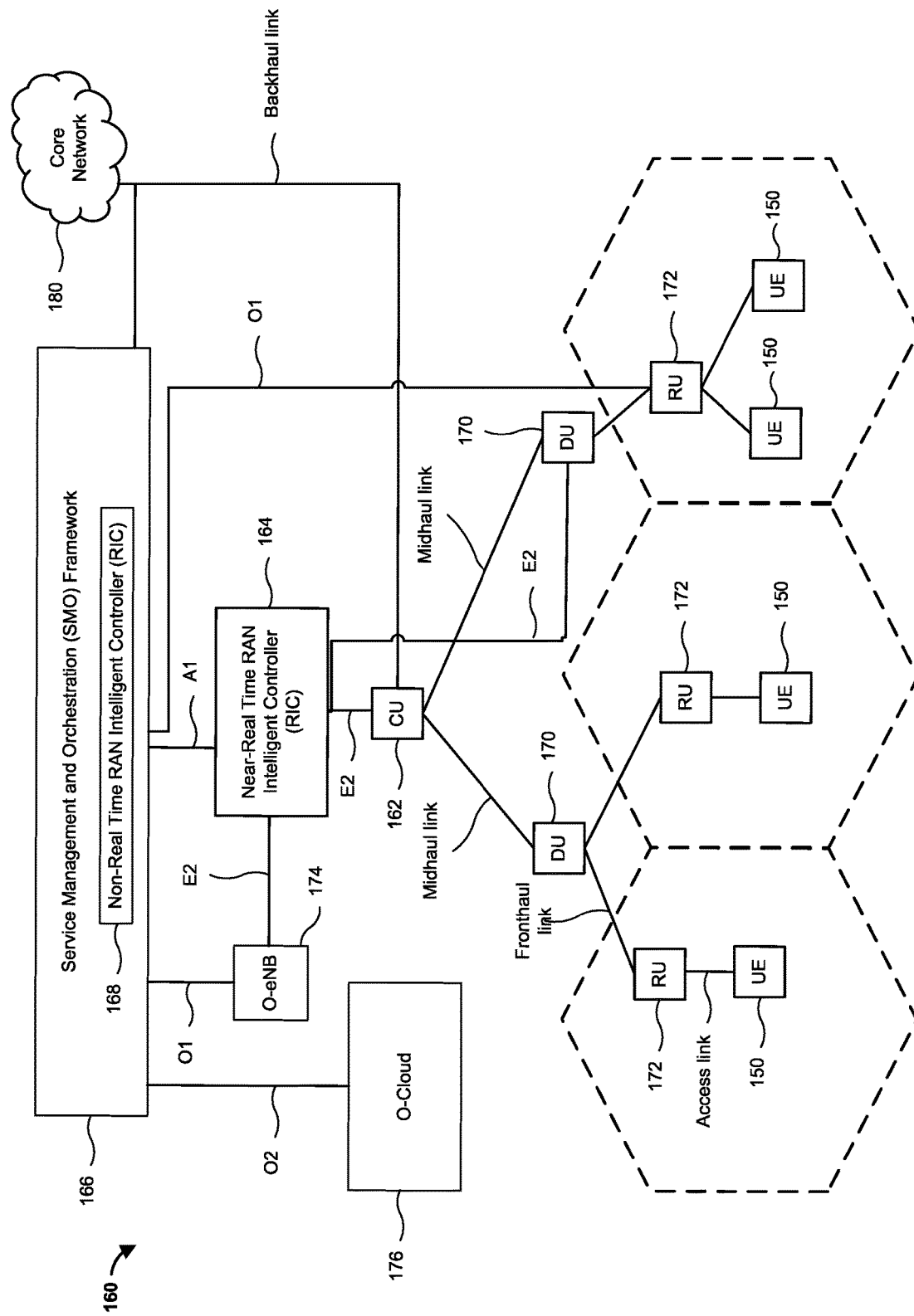
FIG. 1B is a system diagram illustrating an example disaggregated base station architecture suitable for implementing any of the various embodiments.

FIG. 1B is a system block diagram illustrating an example disaggregated base station 160 architecture suitable for implementing any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, the UE 120 may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs as well as a control node 120a of a wireless mesh network. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based RAN architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
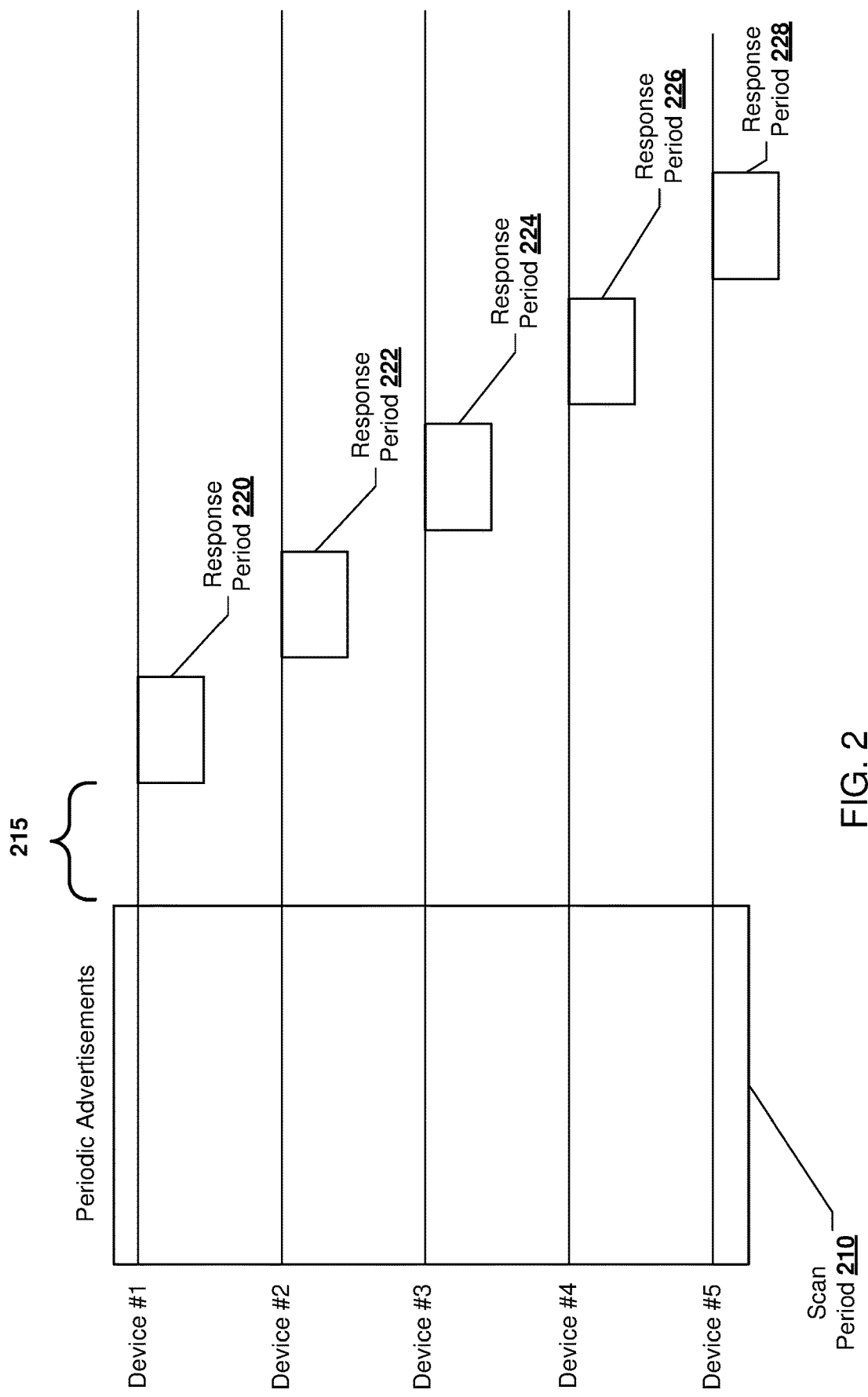
FIG. 2 is a transmission diagram illustrating a communication mode according to various aspects.

FIG. 2 is a signal timing diagram illustrating a portion of a communication between a control node 120a and the mesh network 100. With reference to FIGS. 1A-2, the signal sequence illustrated in FIG. 2 may be implemented by one or more of the communication connections, network nodes, access points, or routing devices of FIG. 1A-1B. The devices #1-#5 of FIG. 2 may be selected from devices 110 and control cluster devices 120 and may receive a periodic advertisement in a scan period 210. The scan period 210 may occur in regularly scheduled intervals and may be repeated periodically such that devices #1-#5 awaken to scan for messages during this repeated scan period 210. The control node 120a may provide periodic advertisements via broadcast or multi-cast to devices #1, #2, #3, #4, and #5 in the scan period 210. For the control node 120a this is its primary transmission period. The transmission may include multiple advertisements in a train. One or more portions of the advertisements may be directed to one or more of the devices #1-#5. The devices #1-#5 may decode or filter the messages intended for each specific device and transmitted during the period when all devices are receiving. In this way, the devices 110 and control cluster devices 120 may be reprogrammed, updated, or sent requests from the control node 120a or relayed from another device through the control node 120a. The periodic advertisement (PA) from the control node 120a may set a response period for one or more of the devices 110 or control cluster devices 120.

As illustrated, devices #1-#5 are each assigned a response period 220, 222, 224, 226, 228 in the time after the scan period 210. The first response period 220 may begin following a brief idle time 215 after the scan period 210, with the idle period long enough to provide the transmitter device an opportunity to do other Bluetooth related activities. The assigned periods may also be limited to or designate a particular frequency of the advertising channels on which to respond. In FIG. 2, device #1 is assigned response period 220; device #2 is assigned response period 222; device #3 is assigned response period 224; device #4 is assigned response period 226; and device #5 is assigned response period 228. The control node 120a may be store attributes of devices 110 and control cluster devices 120 including whether a device is able to transmit or respond. The PA signaling followed by responses is referred to as periodic advertisement with responses (PAwR).

Figure 5:
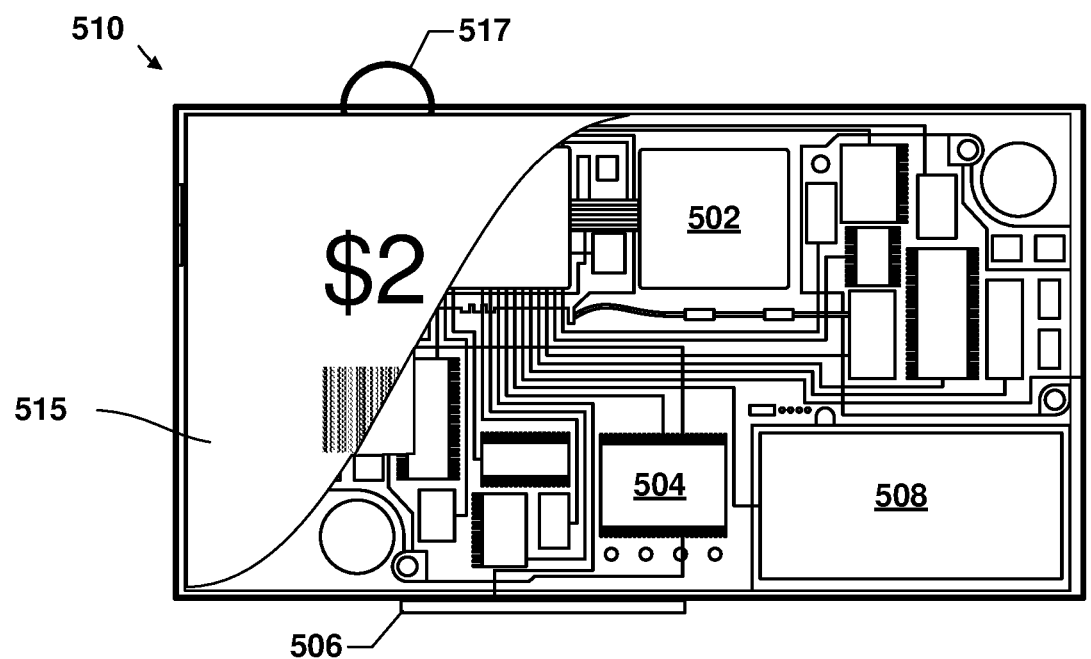
FIG. 5 is a system diagram illustrating a device and components suitable for implementing various aspects.

For example, device #3 may be the tag 510 of FIG. 5 and may receive a price update in a PA from the control node 120a in scan period 210. The PA received at device #3 may include a designated start time for the response period 224 or may include a schedule of response start times for devices including device #3. The response by device #3 to the control node 120a may include an acknowledgement, a status code, and other information such as battery life, received signal strength, or an error notification. The response by device #3 may include information to be relayed to another device of the mesh network 100 by the control node 120a. The response may include a packet with a header and may conform to any of the Bluetooth protocols. A response may be transmitted in a data channel of the Bluetooth protocol to the control node 120a. Both the PA and the responses from all devices may use only the advertising channels of the Bluetooth protocol.

A device (e.g., device #5) that has been assigned a response period may not respond and may determine that it has nothing to signal. In other words, the devices #1-#5 may determine what response if any is required and may or may not respond to a request sent from the control node 120a. The response periods 220-228 may be assigned based on a request for such a period in an open transmission time, the request being sent to the control node 120a. The response periods 220-228 may be assigned based on which devices have been requested by the control node 120a to send data or acknowledgements. The PA messages and responses may be frequency-hopped, time synchronized channels or extended channels of the advertising channels in Bluetooth. Further description of the organization of the mesh network is provided with respect to FIG. 3A and FIG. 4.

Figure 3A:
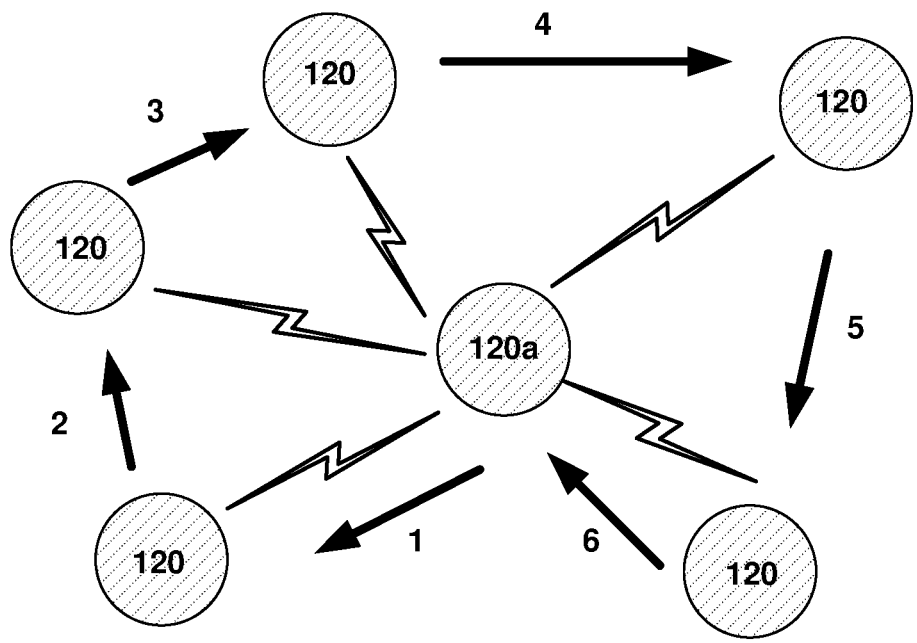
FIG. 3A is a system diagram illustrating an example communications system suitable for implementing any of the various aspects.

FIG. 3A is a system diagram that illustrates control node role switching amongst the group of control cluster devices 120 in accordance with various embodiments. With reference to FIGS. 1A-3A, the group of control cluster devices 120 may include one device functioning as the control node 120a and may communicate with each other via wired or wireless communications (e.g., BLE, WLAN). The organization and collaboration to manage the cluster of devices making up the wireless mesh network (e.g., 110, 120) may be performed only via the advertising channel or may be performed using one or more data channels of the BLE protocol as well as the advertising channels (e.g., PAwR).

The group of control cluster devices 120 may each store information about the devices making up the mesh network 100. This information may be used by the various devices, including the device functioning as the control node 120a to perform operations sufficient to ensure the mesh network is self-healing based on the built-in redundancy provided by the many devices functioning as peripheral nodes 110, 120. For example, each of the control cluster devices 120 may store information about peripheral devices 110 and control cluster devices 120 including round-trip-times to each device relative to the control node 120a, battery lifetimes, status codes, protocol capabilities (e.g., Wi-Fi, 5G, BLE), and assigned response periods. Accordingly, when the control node 120a switches out of the control mode function and returns to operating as a peripheral node within the control cluster, another control cluster device 120 may seamlessly transition to functioning as the control node 120a without data transfer or device profile sharing.

The control cluster devices 120 may store a schedule that indicates when each control cluster device 120 will assume the control node role for the mesh network 100. This schedule enables the role of control node to be shifted from one control cluster device to the next periodically and without the need to establish negotiated direct connections between the devices to affect the role transfer.

In one embodiment, the schedule may be in the form of a data table stored on the control node 120a and each control cluster device 120 that includes a start time when each control cluster device should begin transmitting the PA for the network, assuming the control node role, and an end time when the control node 120a should stop transmitting the PA, relinquishing the control node role and begin listening as a passive node 110, 120.

In another embodiment, the schedule may be in the form of a sequence listing of devices in the control cluster plus a control function duration. Specifically, the control node 120a and each control cluster device 120 may store a list (e.g., data table) of control node device identifiers that identifies the sequence in which the plurality of control node devices 120 should assume the control node function, plus a control function duration that each device should function as the control node. In this embodiment, a control cluster device 120 that is next in the sequence may begin transmitting the PA for the network when the control function duration of the current control node 120a expires, assuming the control node role for the control function duration after which the device will relinquish the control node role and begin functioning as a passive node once it confirms that the next node from the sequence has taken over. In some embodiments, the sequence of devices within the core cluster assuming the control node role may be updated by the current control node and communicated to the control cluster device that is to assume the control node role next or to all control cluster devices.

The role transfer is illustrated as switch 1 in FIG. 3A. The control cluster device assuming the control node role may simultaneously transmit the PA for a brief period along with the control cluster device releasing the control node role to ensure that the handover is complete. At least a portion of the PA message from any control cluster device transmitting in the control node role may be identical or substantially similar so that the role switch is transparent to the mesh network. For example, an identification code for the control node transmitting the periodic advertisements may change, but the remainder of the PA message may remain the same as before the transfer. To peripheral devices 110 and control cluster devices 120, the switch in the control node role may be transparent and maintain synchronization. A peripheral device may have stored information regarding the periodic advertisements from the control node from an existing or ongoing PA train. The stored information regarding periodic advertisements may include timing information, channel map, access address, message integrity check seed, and a PA message counter.

In some embodiments, schedule defining the timing of the control node role switch may include a switch 1, a switch 2, a switch 3, a switch 4, a switch 5, and a switch 6 as illustrated. More switches, for larger groups of control cluster devices 120 are contemplated. The sharing of the control node role reduces overall battery usage and enables the mesh network to be implemented by BLE-capable devices.

When a control node 120a is transferring its role to another control cluster device 120, the control node 120a may perform various processes to ensure that the next device has taken over the role. The control node 120a may identify the next control cluster device (sometimes referred to herein as third device in the control cluster) that will assume the control node role based on the schedule. The control node 120a may monitor for an extended advertisement transmitted by the role-assuming control cluster device (i.e., the third device) indicating that the third device has assumed the control node role or may request an acknowledgement that the control node role will be assumed or can be assumed. In some embodiments, the schedule may be only on the current control node, and the next control node may be informed just in time to take over the role of the control node as well. This process is described in further detail with reference to FIG. 8 and FIG. 9.

Upon not receiving an acknowledgement or a PA message, a control node 120a may continue in the control node role until the schedule provides another device of the control cluster to assume the control node role. In some embodiments, the control node 120a may continue in the control node role until the next transition time. In some embodiments, the control cluster devices 120 may communicate to identify a replacement control cluster device for the control node role before the next scheduled switch. In other words, the control cluster devices 120 may collaborate to re-organize the schedule in response to a failure of a control cluster device to assume the control node function, such as when a control cluster device fails or is moved out of wireless reception range of the other cluster devices or is determined not to be suitable enough to perform the role of a control node.

The schedule for switching the control node function among the control cluster devices may be developed or determined when the mesh network is organized or at another point in time based on one or more communications between control cluster devices (e.g., information sharing such as battery power). This collaboration may be exchanged between control cluster devices 120 via the advertising channels (e.g., BLE advertising and responses) or may be exchanged via data channels or other channels. As noted previously, the control cluster devices 120 may share their attributes or specifications, and this information may be used by the devices to determine an ordering of the control cluster devices in the schedule. Accordingly, the control cluster devices of the mesh network may implement a management scheme that is both collaborative and centralized.

Figure 3B:
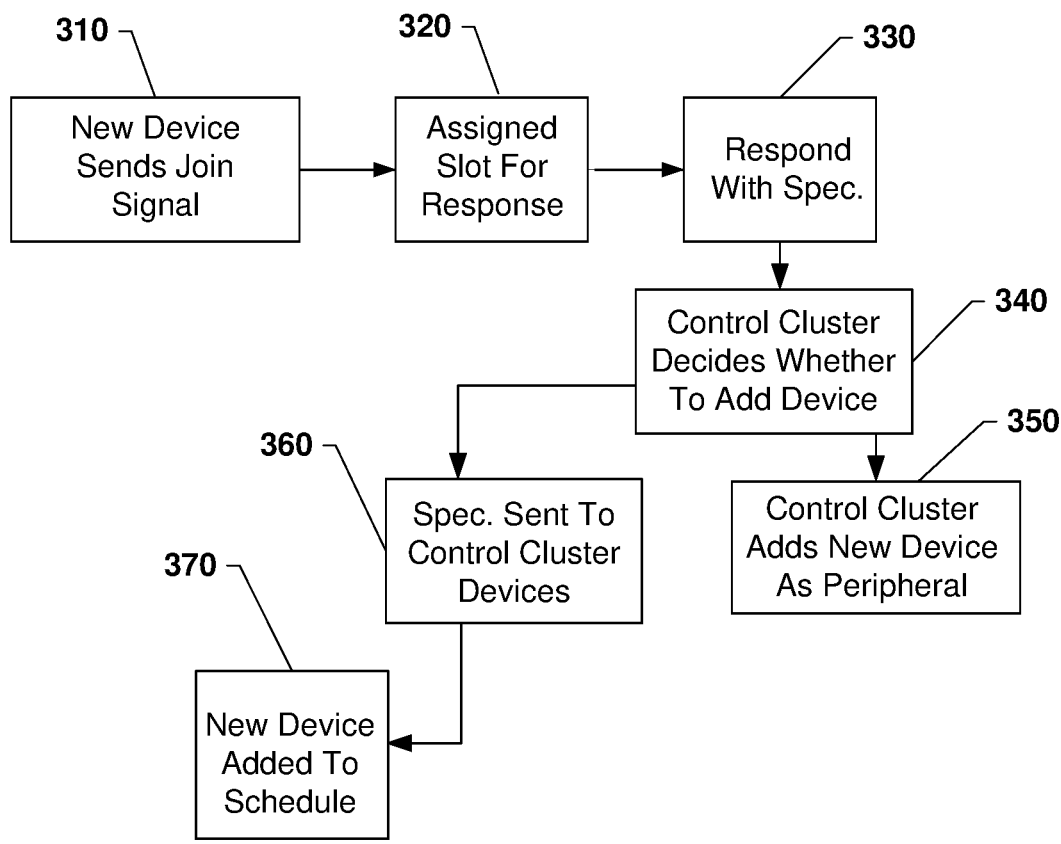
FIG. 3B is a flow diagram illustrating an example method for implementing various aspects.

FIG. 3B is a process block diagram that illustrates an example sequence of events that may enable a wireless device to join the wireless mesh network and be assigned a role, such as a peripheral node or a control cluster node.

In block 310, the new device sends a join signal via an extended channel, or via a pairing process according to the Bluetooth protocol, or via a BLE beacon. After the initial notification by the new device of its presence to the mesh network 100, the control node 120*a* may receive the notification and, in block 320, may assign a slot for response after the next PA and may be informed of the assigned slot in a PA. In block 330, the new device may respond in the assigned response slot (e.g., response period 220) with a specification or attributes of the new device. For example, the new device may indicate that it periodically requires a data update or that it periodically needs a response slot to transmit data (e.g., periodic reporting such as refrigerator temperature or milk bottle temperature). The new device may provide information on capabilities such as transmission strength, battery charge state and/or storage capacity, other communication connection capabilities, and proximity to other devices within the mesh network.

In block 340, the control cluster devices or the control node 120*a* may decide where to add the device to the mesh network 100. The new device may be rejected after a security check, failed authentication, or a determination of incompatibility, for example.

In block 360, the control cluster devices or control node may share the specification or capabilities of the new device with the other control cluster devices as a part of adding a new device to the control cluster.

In block 350, one or more control cluster devices or the control node may determine that the new device does not meet one or more criteria to be a control node and, in response, add the new device as a peripheral node. A peripheral device may participate in the mesh network and but not join the group of control cluster devices.

In block 370, the control cluster devices or control node may determine a timing for the assumption of the control node role for the new device. In other words, the new device may be added to the schedule based on collaboration or the shared specification. The new device may be added to the schedule later after one or more conditions change, for example. Accordingly, the group of control cluster devices 120 may collaborate to manage additions to the mesh network 100.

Figure 4:
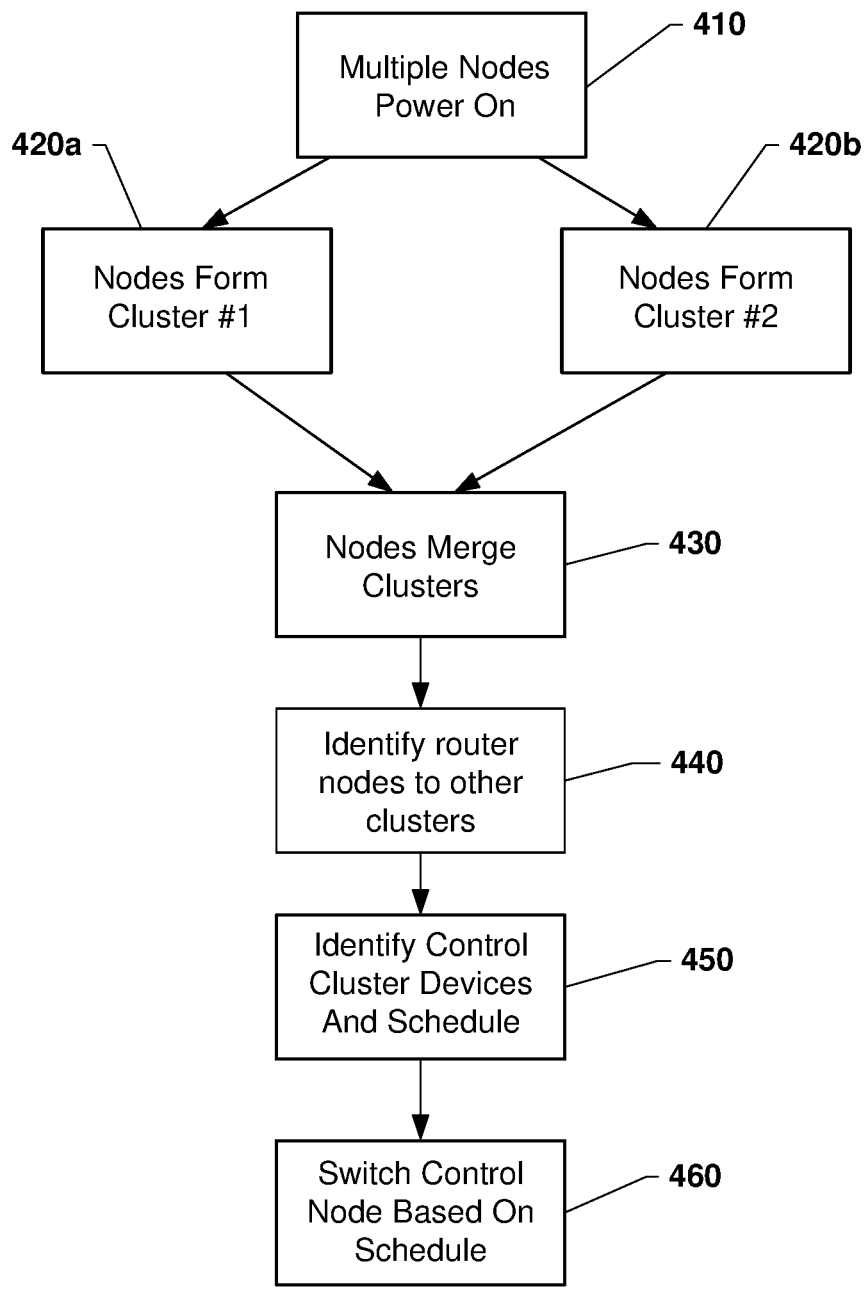
FIG. 4 is a process flow diagram illustrating an example process of network formation suitable for implementing various aspects.

FIG. 4 is a process flow diagram illustrating a series of operations that may be performed to initialize the mesh network. With reference to FIGS. 1A-4, in block 410, multiple nodes or devices may power on or begin signaling (e.g., emitting BLE beacon). One or more of the initialized devices or nodes may form a first cluster #1 in block 420*a*. One or more of the initialized devices or nodes may form a second cluster #2 in block 420*b*. In forming each cluster, the relative signal strengths of surrounding devices may be used by the various devices to identify those devices with which wireless communications can be reliably exchanged, with the first and second clusters assemble such that all devices in one cluster can reliably communicate with all other devices in the same cluster.

In some embodiments, as part of forming each cluster in blocks 420*a* and 420*b*, the devices may identify the group of devices capable of functioning as the control node, based on location and device capabilities, and organize the control cluster as described herein. In some implementations, all devices in the mesh network may have the capabilities to function as control nodes, in which case only the location (e.g., based on signal strength measurements) may be the basis for selecting the devices to include in the control cluster. As part of the process of selecting/identifying the control cluster devices, the control cluster devices may develop or identify a schedule or sequence plus duration for rotating the control node function as described herein.

In block 430, the nodes may merge the two or more clusters (e.g., cluster #1 and cluster #2) by forming a communication link between the clusters. The merging of the clusters may be performed by control nodes of each cluster or a consensus of control cluster devices of a cluster. The merging may be based on a proximity of the control cluster devices of each cluster, a distance to peripheral devices of each cluster, the battery life of core, or other aspects of the clusters such that merging enhances performance and stability of the network. The merge process may begin after control cluster devices of the clusters are no longer receiving join requests from new devices or when such activity has reduced below a threshold.

After zero, one, or more merges, a control node or the control cluster devices 120 may determine that nearby clusters should not be merged or joined. In other words, the membership of devices 110 and control cluster devices 120 in each cluster may become stable and one or more devices 110/120 may be aware of adjacent clusters. In block 440, the control cluster devices 120 may identify router nodes that may be configured or configurable to route messages from control cluster devices of one cluster to one or more control cluster devices of another cluster. The controlled-flooding routing of the mesh network of a cluster may forward one or more designated packets between control cluster devices 120 and devices 110 on the periphery such that the designated packets reach the router nodes and are passed on to the other cluster. Router nodes may be synchronized in two separate clusters and listen for PA messages from two clusters and may respond in two clusters.

In block 450, the control cluster devices 120 may identify a list of such devices belonging to the same cluster and may determine a schedule for sharing for switching the role of control node 120*a* amongst the control cluster devices.

In block 460, the control cluster devices and control node may begin switching the control node function based on the schedule as described herein.

FIG. 5 is a component block diagram of an example of a BLE-capable IOT device in the form of an electronic tag 510 that may function as a peripheral device, in a wireless mesh network according to various embodiments. With reference to FIGS. 1A-5, an electronic tag 510 may include a display 515 and an illuminator 517 (e.g., a light emitting diode (LED) or other type of visible indicator) that are coupled to a processor 502 that is configured with processor-executable instructions configured to cause the processor to perform operations of various embodiments. The processor 502 may be coupled to a wireless transceiver 504, such as a BLE transceiver or a combination BLE and Wi-Fi transceiver, that is coupled to an antenna 506 for sending and receiving radio frequency (RF) signals as described herein. In various embodiments, the processor 502 may include an SOC (e.g., 602, 604). An electronic tag 510 may be powered by a battery 508, freeing the electronic tag 510 from having to be connected to a wired power supply. Alternatively, the electronic tag 510 may be powered from an external source.

The electronic tag 510 may be configured to receive periodic advertisements via the transceiver 504 (e.g., price updates for the display 515). The electronic tag 510 may be configured to transmit periodic advertisements and responses via the transceiver 504. The electronic tag 510 may be configured for a passive mode where PA messages are not sent or may be configured in a listen-only mode where PA messages are received and may be used but responses are not part of its regular communication with the mesh network. Based on the configuration of the electronic tag 510, it may be added to the mesh network by the control node or the control cluster devices as a peripheral devices or non-control cluster device.

Figure 6:
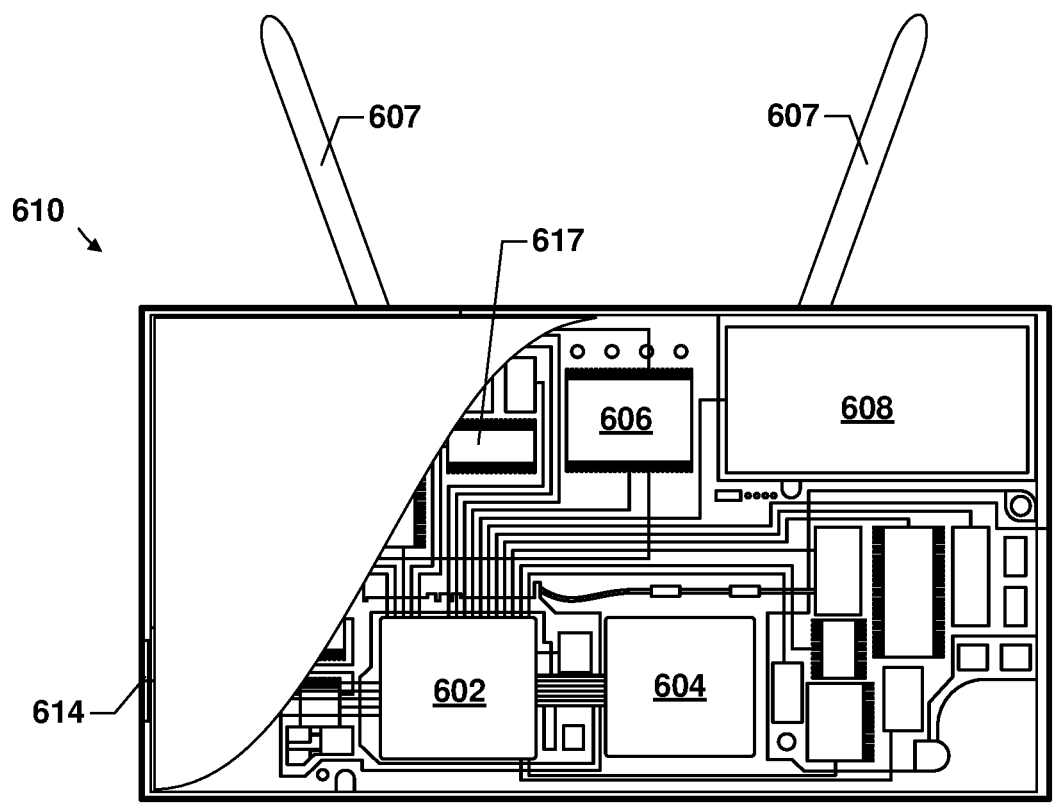
FIG. 6 is a system diagram illustrating a device and components suitable for implementing various aspects.

FIG. 6 is a component block diagram of an example of a BLE-capable IOT device in the form of an electronic tag 510 that may function as a control cluster device 610 (e.g., control node 120a) in accordance with various embodiments. With reference to FIGS. 1A-6, the control cluster device 610 may include a processor 602, 604 coupled to volatile memory 606 and optionally a larger capacity non-volatile memory 608. The control cluster device 610 may also include a peripheral memory access device, such as a flash drive, coupled to the processor 602, 604. The control cluster device 610 may also include network access ports 614 (or interfaces) coupled to the processor 602, 604 for establishing data connections with a network, such as the Internet and/or a local area network coupled to other system computers and servers. The control cluster device 610 may include additional access ports, such as USB, Firewire, Thunderbolt, and the like for coupling to peripherals, external memory, or other devices. The control cluster device 610 may include one or more antennas 607 coupled to a transceiver 617 for sending (i.e., transmitting) and receiving electromagnetic radiation that may be connected to a wireless communication link. The control cluster device 610 may be battery powered or may be hardwired to power.

The control cluster device 610 may be configured to receive periodic advertisements via the transceiver 617. The control cluster device 610 may be configured to transmit periodic advertisements and responses via the transceiver 617. Various attributes such as higher gain antennas, longer battery life, no display to reduce batter life, or larger processors 602/604 may enable the control cluster device 610 to operate as the control node 120a and, thus, be added as a control cluster device 120 of a cluster of the mesh network 100.

Figure 7:
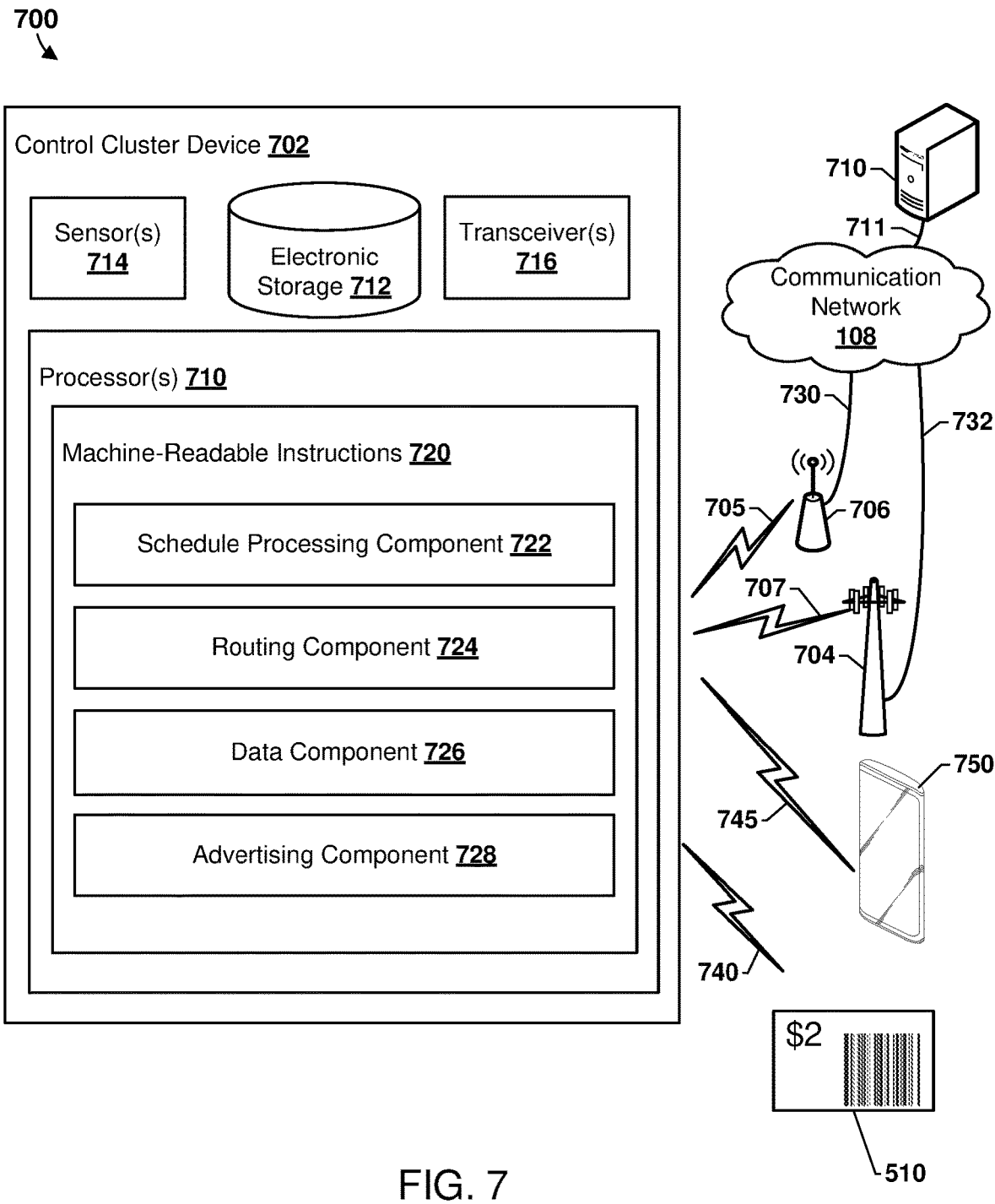
FIG. 7 is a component block diagram of an example of a computing device suitable implementing various aspects.

FIG. 7 is a system component diagram 700 of the control cluster device 702 (e.g., control cluster device 120/610) suitable for use with various embodiments. The control cluster device 702 may be configured to communicate with external resources via a wireless connection 705/707 to a wireless communication network 108, such as a cellular wireless communication network. Wireless connection 705 may be a radio link to picocell 706 which may connect via backhaul or midhaul 730 to communication network 108. Wireless connection 707 may be a radio link to gNB 704 which may connect via backhaul or midhaul 732 to communication network 108. The communication network 108 may connect to a data server via link 711 (e.g., fiber). The control cluster device 702 may connect via wireless connection 745 to a user equipment (UE) 750 (e.g., cellular phone) and may connect to electronic tag 510 via wireless connection 740.

The control cluster device 702 may include one or more processors 710, electronic storage 712, one or more sensor(s) 714, a transceiver 716 (e.g., wireless transceiver), and other components. The control cluster device 702 may include communication lines, or ports to enable the exchange of information with a network and/or other computing platforms. Illustration of the control cluster device 702 in FIG. 7 is not intended to be limiting. The control cluster device 702 may include a plurality of hardware, software, and/or firmware components operating together to provide the functionality attributed herein to the control cluster device 702.

Electronic storage 712 may include non-transitory storage media that electronically stores information. The electronic storage media of electronic storage 712 may include one or both of system storage that is provided integrally (i.e., substantially non-removable) with the control cluster device 702 and/or removable storage that is removably connectable to the control cluster device 702 via, for example, a port (e.g., a universal serial bus (USB) port, a firewire port, etc.) or a drive (e.g., a disk drive, etc.). Electronic storage 712 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 712 may include one or more virtual storage resources (e.g., cloud storage, a virtual private network, and/or other virtual storage resources). Electronic storage 712 may store software algorithms, information determined by processor(s) 710, information received from the control cluster device 702, information received from server 710, external resources (e.g., UE 750), and/or other information that enables the control cluster device 702 to function as described herein.

Processor(s) 710 may include one of more local processors (as described with respect to FIG. 12), which may be configured to provide information processing capabilities in the control cluster device 702 (e.g., control cluster device 610). As such, processor(s) 710 may include one or more of a digital processor, an analog processor, a digital circuit designed to process information, an analog circuit designed to process information, a state machine, and/or other mechanisms for electronically processing information. Although processor(s) 710 is shown in FIG. 7 as a single entity, this is for illustrative purposes only. In some embodiments, processor(s) 710 may include a plurality of processing units. These processing units may be physically located within the same device, or processor(s) 710 may represent processing functionality of a plurality of devices operating in coordination.

The control cluster device 702 may be configured by machine-readable instructions 720, which may include one or more instruction modules. The instruction modules may include computer program components. In particular, the instruction modules may include one or more of a schedule processing component 722, a routing component 724, a data component 726, an advertising component 728, and/or other instruction modules. Together these components (e.g., 722-728) of control cluster device 702 may manage one or more aspects of mesh network 100 as also illustrated in FIG. 1 and FIG. 3A.

The schedule processing component 722 may receive one or more start times or proposed start times from one or more control cluster devices for starting a role of control node. The schedule processing component 722 may receive updates on status (e.g., connection status) and capabilities from the control cluster devices. The schedule processing component 722 may receive internal updates on the status of the control cluster device 702. The schedule processing component 722 may process this information to propose a start time for the control cluster device 702 to assume a role of control node and may process this information to propose a schedule of start times for one or more other control cluster devices. As a non-limiting example, the processor(s) 710 of the control cluster device 702 may receive schedule information and specifications, and/or use one or more transceivers (e.g., 716) for detecting available wireless connections (e.g., Wi-Fi, Bluetooth, cellular, etc.) and for obtaining other device attributes and sensing cluster attributes.

The routing component 724 may include one or more processes for managing queues of data packets and for monitoring received signals from transceiver 716 for information that is to be sent onwards as part of the controlled-flooding routing of the mesh network. For example, routing component 724 may determine which packets or advertisements are re-transmitted and may store one or more packets or advertisements. As a non-limiting example, the processor(s) 710 of the control cluster device 702 may execute one or more routing algorithms on the processors, and/or use one or more transceivers (e.g., 716) to receive and transmit advertisements and responses in the BLE mesh network.

The data component 726 may receive information from one or more devices on the network that is transmitted via the data channels of a Bluetooth network or other wireless network. The data component 726 may convert one or more packets of data received from the data channel to elements of a periodic advertisement to be transmitted over advertising channels. For example, the data component 726 may receive and store updated price information and information on associated electronic tags 510 and the data component 726 may convert the update information to a PA message to all the electronic tags 510 included in the update. As a non-limiting example, the processor(s) 710 of the control cluster device 702 may store and use data that has been received via the data channel of a BLE protocol. The transceiver 716 of the control cluster device 702 may transmit one or more data messages on a data channel and may transmit the PA messages from the data component 726.

The advertising component 728 of control cluster device 702 may receive information from one or more devices on the network that is transmitted via advertising channels of a Bluetooth network or other wireless network. The advertising component 728 may convert one or more PA messages received from the advertising channel to data to be stored in electronic storage 712 or re-transmitted according to determinations by routing component 724. The advertising component 728 may receive response requests or generate response requests for control cluster device 702 to response to another device via advertising channels. As a non-limiting example, the processor(s) 710 of the control cluster device 702 may execute the processing of PA messages on the processors, and/or use one or more transceivers (e.g., 716) to connect to the mesh network for advertising and responses. The processor(s) 310 of the computing device 302 may execute the advertising component 728 to provide a network organizing method operable via only the advertising channel.

Figure 8:
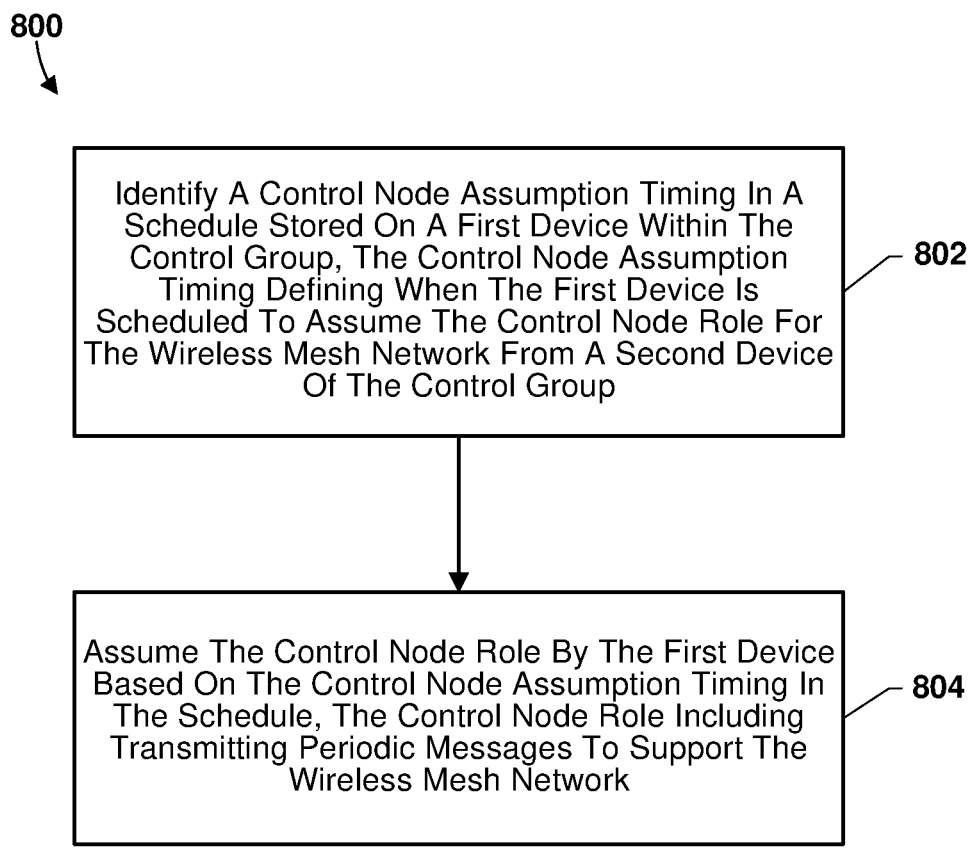
FIG. 8 is a process flow diagram illustrating an example method according to various aspects.

FIG. 8 is a process flow diagram illustrating a method 800 for switching control node roles among control cluster devices of a wireless mesh network. With reference to FIGS. 1A-8, various operations of the method 800 may be performed by a processor (e.g., 602, 604, 710) coupled to memory (e.g., 712) of a wireless device (e.g., 120, 120a).

In block 802, a control cluster device (a "first device" in the claims) within the control cluster may identify a control node assumption timing in a schedule stored in memory (e.g., 712). As described, the control node assumption timing may identify when the control cluster device (i.e., first device) is scheduled to assume the control node role for the wireless mesh network from a current control node (a "second device" in the claims) in the control cluster. As described, this may involve recognizing from a schedule when the control cluster device is scheduled to assume the control node function, which may be based on a stored data table or a stored sequence plus expiration of a control function duration. Means for performing the operations of block 802 may include a processor (e.g., 602, 604, 710) coupled to memory (e.g., 712).

In block 804, a control cluster device may assume the control node role from a first control cluster device based on a control node assumption timing in a schedule stored in memory (e.g., 712). Assuming the control node role may include transmitting periodic messages to support the wireless mesh network. Means for performing the operations of block 804 may include a processor (e.g., 602, 604, 710) coupled to memory (e.g., 712).

Figure 9:
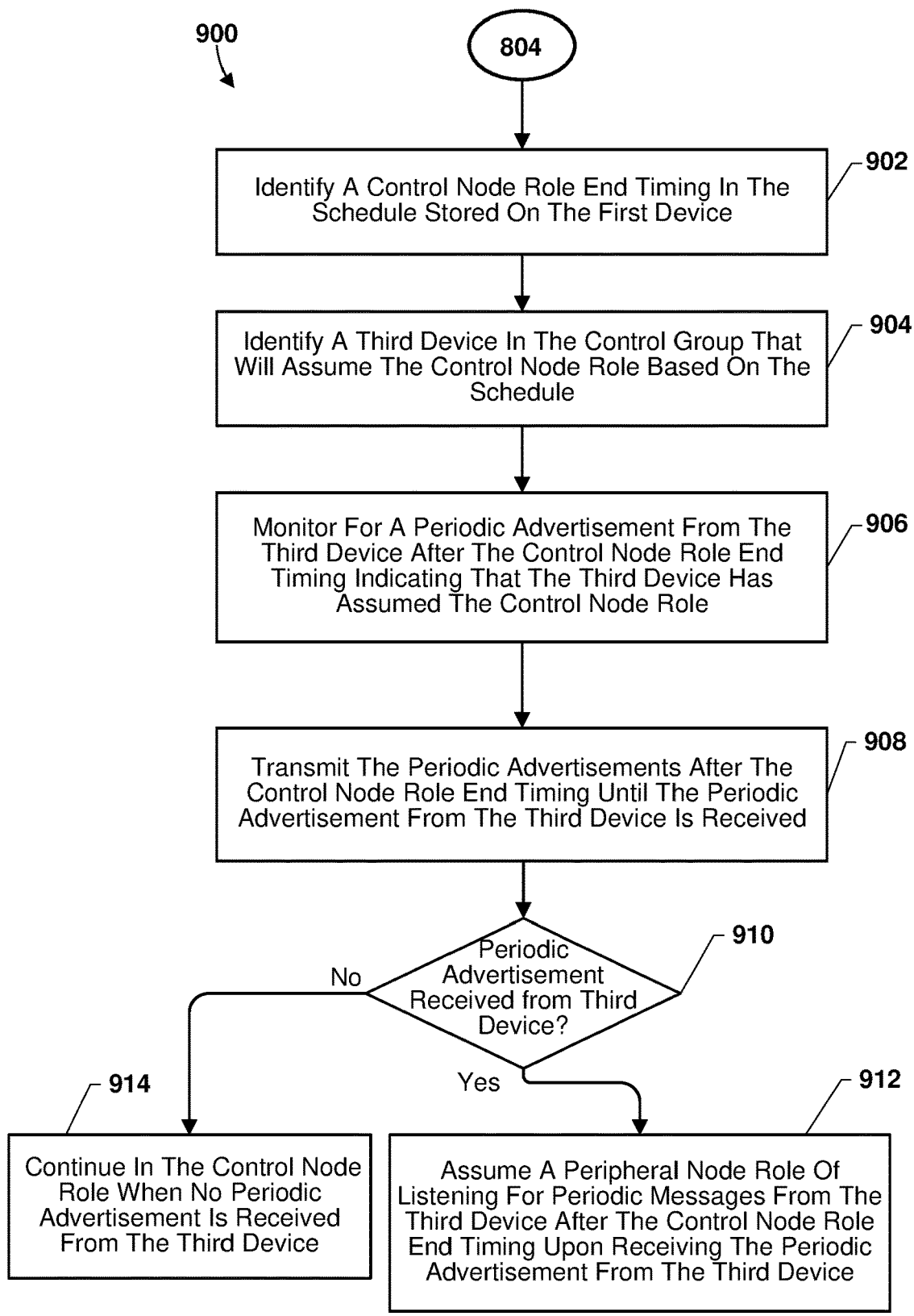
FIG. 9 is process flow diagram illustrating an example method according to some aspects.

FIG. 9 is a process flow diagram illustrating an example process 900 for switching control node roles of a network. With reference to FIGS. 1A-9, various operations of the method 800 may be performed by a processor (e.g., 602, 604, 710) coupled to memory (e.g., 712) of a wireless device (e.g., 120, 120a).

After a while of performing the control node functions in block 804, the control cluster device (i.e., first device) may identifying a control node role end timing in the schedule stored in memory (e.g., 712). Again as described, this may involve recognizing from a schedule when the control cluster device is scheduled to relinquish the control node function, which may be based on a stored data table or a stored sequence plus expiration of a control function duration. Means for performing the operations of block 902 may include a processor (e.g., 602, 604, 710) coupled to memory (e.g., 712).

In block 904, the control cluster device (i.e., first device) may identify the next control cluster device (a "third device" in the claims) that will assume the control node role based on the schedule stored in memory. Means for performing the operations of block 904 may include a processor (e.g., 602, 604, 710) coupled to memory (e.g., 712).

In block 906, the control cluster device (i.e., first device) may monitor for a periodic advertisement transmitted by the third device after the scheduled control node role ending time. Reception of a periodic advertisement from the third device may indicate that the third device has successfully assumed the control node role. Means for performing the operations of block 906 may include a processor (e.g., 602, 604, 710) coupled to memory (e.g., 712).

While monitoring for a periodic advertisement transmitted by the third device in block 906, the control cluster device (i.e., first device) may continue to transmit the periodic advertisements in block 908. Means for performing the operations of block 908 may include a processor (e.g., 602, 604, 710) coupled to memory (e.g., 712).

In determination block 910, the control cluster device (i.e., first device) may determine whether a periodic advertisement was received from the third device. Means for performing the operations of block 910 may include a processor (e.g., 602, 604, 710) coupled to memory (e.g., 712) or from a remote source, such as a remote system or external resources using a transceiver (e.g., 617, 716) and related components. If yes, the control cluster device may continue to block 912; and, if no, then the control cluster device may continue to block 914

In response to determining that a periodic advertisement has been received from the third device (i.e., determination block 910="Yes"), the control cluster device (i.e., first device) may assume a peripheral node role in block 912. In the peripheral role, the control cluster device (i.e., first device) may begin listening for periodic advertisements transmitted by the third device and responding like other peripheral nodes until the next time the device should assume the control node role. Means for performing the operations of block 912 may include a processor (e.g., 602, 604, 710) coupled to memory (e.g., 712).

In response to determining that a periodic advertisement has not been received from the third device (i.e., determination block 910="No"), the control cluster device (i.e., first device) may continue in the control node role transmitting the periodic advertisements without interruption. The control cluster device (i.e., first device) may continue in the control node role until the next end time for switching the control node functions, such as determined in block 902. In some embodiments, the control cluster device (i.e., first device) may use the control node role to reorder or reorganize the schedule for shifting the control node function among the control cluster devices, such as to respond to a control cluster device malfunctioning or being physically removed from the mesh network. Means for performing the operations of block 914 may include a processor (e.g., 602, 604, 710) coupled to memory (e.g., 712) or from a remote source, such as a remote system or external resources using a transceiver (e.g., 617, 716) and related components.

Figure 10:
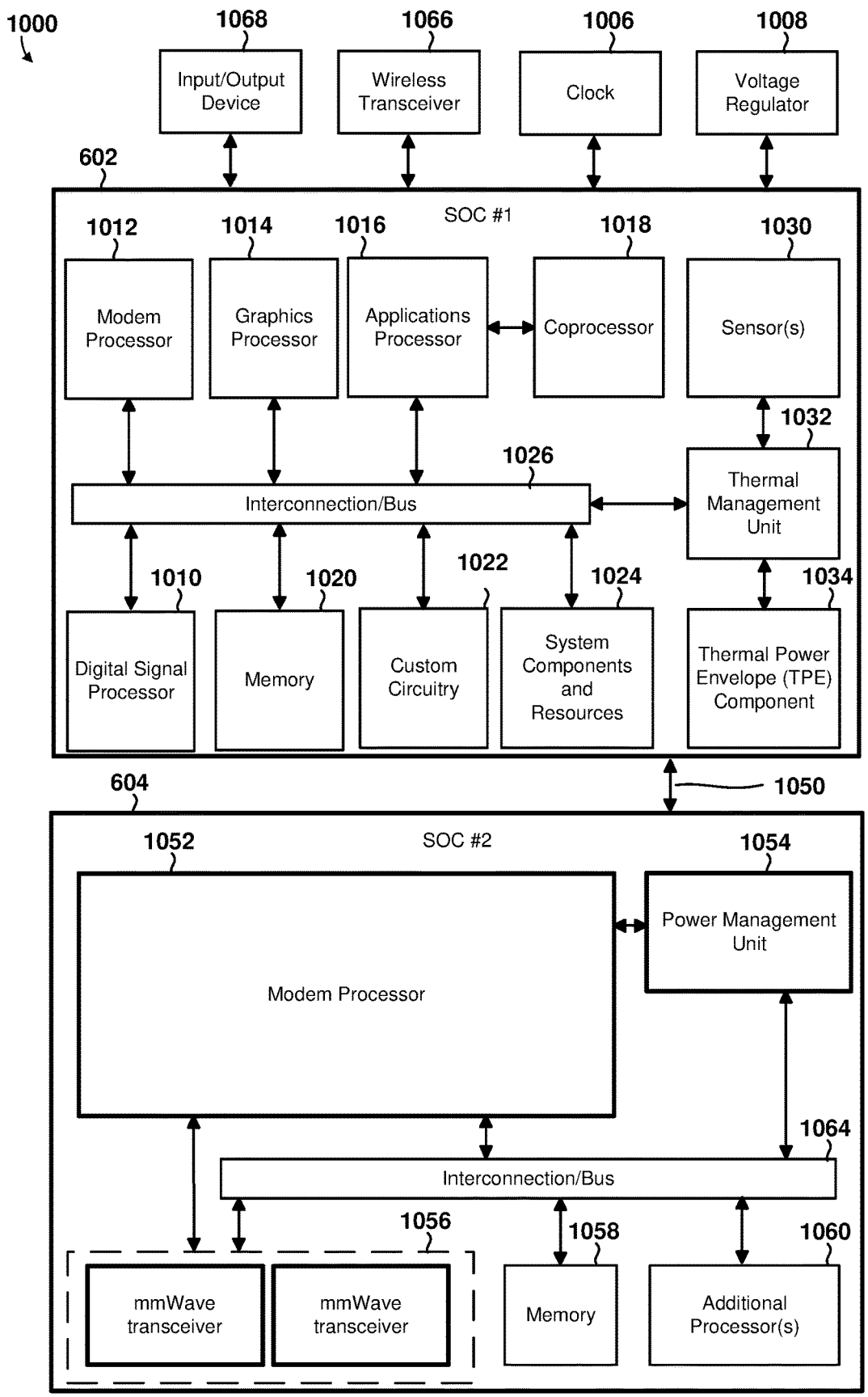
FIG. 10 is a system block diagram illustrating components suitable for implementing various aspects.

FIG. 10 is a component block diagram of an example computing and wireless modem system 1000 suitable for use in devices implementing any of the various embodiments. The example computing and wireless modem system 1000 may be implemented on a number of single processor and multiprocessor computer systems, including a system-on-chip (SOC) or system in a package (SIP).

With reference to FIGS. 1A-10, the illustrated example computing system 1000 includes a two SOCs 602, 604 coupled to a clock 1006, a voltage regulator 1008, and a wireless transceiver 1066 configured to send and receive wireless communications via an antenna (not shown) to/from a UE (e.g., 750) or a network device (e.g., 110, 120, 510). In some implementations, the first SOC 602 may operate as central processing unit (CPU) of a control cluster device 120 that carries out the instructions of software application programs by performing the arithmetic, logical, control and input/output (I/O) operations specified by the instructions. In some implementations, the second SOC 604 may operate as a specialized processing unit. For example, the second SOC 604 may operate as a specialized 5G processing unit responsible for managing high volume, high speed (such as 5 Gbps, etc.), and/or very high frequency short wavelength (such as 28 GHz mmWave spectrum, etc.) communications.

The first SOC 602 may include a digital signal processor (DSP) 1010, a modem processor 1012, a graphics processor 1014, an application processor 1016, one or more coprocessors 1018 (such as vector co-processor) connected to one or more of the processors, memory 1020, custom circuitry 1022, system components and resources 1024, an interconnection/bus module 1026, one or more temperature sensors 1030, a thermal management unit 1032, and a thermal power envelope (TPE) component 1034. The second SOC 604 may include a 5G modem processor 1052, a power management unit 1054, an interconnection/bus module 1064, a plurality of mmWave transceivers 1056, memory 1058, and various additional processors 1060, such as an applications processor, packet processor, etc.

Each processor 1010, 1012, 1014, 1016, 1018, 1052, 1060 may include one or more cores and one or more temperature sensors, and each processor/core may perform operations independent of the other processors/cores. For example, the first SOC 602 may include a processor that executes a first type of operating system (such as FreeBSD, LINUX, OS X, etc.) and a processor that executes a second type of operating system (such as MICROSOFT WINDOWS 10). In addition, any or all of the processors 1010, 1012, 1014, 1016, 1018, 1052, 1060 may be included as part of a processor cluster architecture (such as a synchronous processor cluster architecture, an asynchronous or heterogeneous processor cluster architecture, etc.).

The first and second SOC 602, 604 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 1024 of the first SOC 602 may include power amplifiers, voltage regulators, oscillators, phase-locked loops, peripheral bridges, data controllers, memory controllers, system controllers, access ports, timers, and other similar components used to support the processors and software clients running on a control cluster device. The system components and resources 1024 and/or custom circuitry 1022 also may include circuitry to interface with peripheral devices, such as cameras, electronic displays, wireless communication devices, external memory chips, etc.

The first and second SOC 602, 604 may communicate via interconnection/bus module 1050. The various processors 1010, 1012, 1014, 1016, 1018, may be interconnected to one or more memory elements 1020, system components and resources 1024, and custom circuitry 1022, and a thermal management unit 1032 via an interconnection/bus module 1026. Similarly, the processor 1052 may be interconnected to the power management unit 1054, the mmWave transceivers 1056, memory 1058, and various additional processors 1060 via the interconnection/bus module 1064. The interconnection/bus module 1026, 1050, 1064 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 602, 604 may further include an input/output module 1068 for communicating with resources external to the SOC, such as a clock 1006 and a voltage regulator 1008. Resources external to the SOC (such as clock 1006, voltage regulator 1008) may be shared by two or more of the internal SOC processors/cores. In addition to the example SIP 1000 discussed above, some implementations may be implemented in a wide variety of computing systems, which may include a single processor, multiple processors, multicore processors, or any combination thereof.

The processors of the control cluster devices and the network server 1000 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 604 dedicated to wireless communication functions and one processor within an SOC 602 dedicated to running other applications. Software applications may be stored in the memory 712 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the methods and operations of FIGS. 8 and 9 may be substituted for or combined with one or more operations of the methods and operations of FIGS. 8 and 9.

Implementation examples are described in the following paragraphs. While some of the following implementation examples are described in terms of example methods, further example implementations may include: the example methods discussed in the following paragraphs implemented by a device (e.g., a wireless device) including a processor configured with processor-executable instructions to perform operations of the methods of the following implementation examples; the example methods discussed in the following paragraphs implemented by a device including means for performing functions of the methods of the following implementation examples; and the example methods discussed in the following paragraphs may be implemented as a non-transitory processor-readable storage medium having stored thereon processor-executable instructions configured to cause a processor of a device to perform the operations of the methods of the following implementation examples.

Example 1. A method for rotating a control node role among devices in a control cluster of a wireless mesh network, including: identifying a control node assumption timing in a schedule stored on a first device within the control cluster, the control node assumption timing defining when the first device is scheduled to assume the control node role for the wireless mesh network from a second device of the control cluster; and assuming the control node role by the first device based on the control node assumption timing in the schedule, the control node role including transmitting periodic messages to support the wireless mesh network.

Example 2. The method of example 1, further including: identifying a control node role end timing in the schedule stored on the first device; identifying a third device in the control cluster that will assume the control node role based on the schedule; monitoring for an extended advertisement from the third device after the control node role end timing indicating that the third device has assumed the control node role; transmitting the periodic messages after the control node role end timing until the extended advertisement from the third device is received; and assuming a passive node role of listening for periodic messages from the third device after the control node role end timing upon receiving the extended advertisement from the third device; or continuing the control node role when no extended advertisement is received from the third device.

Example 3. The method of example 2, in which continuing the control node role when no extended advertisement is received from the third device further includes: identify a fourth device in the control cluster that will assume the control node role based on the schedule; adjusting the schedule to shift the control node assumption timing of the fourth device; requesting a premature transfer of the control node role; receiving an acknowledgement from the fourth device of the shift in the control node assumption timing; monitoring for a periodic advertisement from the fourth device after the acknowledgment indicating that the fourth device has assumed the control node role; and assuming the control node role of listening for periodic messages from the third device after the control node role end timing upon receiving the periodic advertisement from the fourth device.

Example 4. The method of example 2, in which continuing the control node role when no extended advertisement is received from the third device further includes: continuing in the control node role until the schedule provides another device of the control cluster to assume the control node role.

Example 5. The method of any of examples 1-4, further including: receiving a plurality of attributes from devices during organization of the mesh network; identifying a plurality of devices within the mesh network suitable for the control cluster based on the received plurality of attributes; compiling the schedule for transfer of the control node role among the plurality of devices of the control cluster; storing the schedule in memory of the first device; and communicating the schedule to each of the plurality of devices of the control cluster for storage.

Example 6. The method of any of examples 1-5, further including: collaborating with one or more of the plurality devices of the control cluster to identify a sequence of the control node role allocation, in which the first device is a member of the control cluster, and in which at least two of the plurality of devices of the control cluster are identified in the schedule stored on the first device.

Example 7. The method of any of examples 1-6, in which the plurality of attributes includes at least one attribute related to suitability for serving in the control cluster selected from: a battery level; an expected battery life; a proximity to other devices of the cluster; a transceiver battery usage; or an operating power mode.

Example 8. The method of any of examples 1-7, further including: receiving one or more consensus inputs from the plurality of devices of the control cluster to define the schedule, the one or more consensus inputs relating to an order of transferring the control node role in the control cluster.

Example 9. The method of any of examples 1-8, further including: transmitting, from the first device, a plurality of attributes to other devices in the control cluster.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for rotating a control node role among devices in a control cluster of a wireless mesh network, comprising:
   identifying a control node assumption timing in a schedule stored on a first device within the control cluster, the control node assumption timing defining when the first device is scheduled to assume the control node role for the wireless mesh network from a second device of the control cluster;
   assuming the control node role by the first device based on the control node assumption timing in the schedule, the control node role including transmitting periodic messages to support the wireless mesh network;
   identifying a control node role end timing in the schedule stored on the first device;
   identifying a third device in the control cluster that will assume the control node role based on the schedule;
   monitoring for an extended advertisement from the third device after the control node role end timing indicating that the third device has assumed the control node role;
   transmitting the periodic messages after the control node role end timing until the extended advertisement from the third device is received; and
   assuming a passive node role of listening for periodic messages from the third device after the control node role end timing upon receiving the extended advertisement from the third device; or
   continuing the control node role when no extended advertisement is received from the third device.

2. The method of claim 1, wherein continuing the control node role when no extended advertisement is received from the third device further comprises:
   identify a fourth device in the control cluster that will assume the control node role based on the schedule;
   adjusting the schedule to shift the control node assumption timing of the fourth device;
   requesting a premature transfer of the control node role;
   receiving an acknowledgement from the fourth device of the shift in the control node assumption timing;
   monitoring for a periodic advertisement from the fourth device after the acknowledgment indicating that the fourth device has assumed the control node role; and
   assuming the control node role of listening for periodic messages from the third device after the control node role end timing upon receiving the periodic advertisement from the fourth device.

3. The method of claim 1, wherein continuing the control node role when no extended advertisement is received from the third device further comprises:
   continuing in the control node role until the schedule provides another device of the control cluster to assume the control node role.

4. The method of claim 1, further comprising:
   receiving a plurality of attributes from devices during organization of the mesh network;
   identifying a plurality of devices within the mesh network suitable for the control cluster based on the received plurality of attributes;
   compiling the schedule for transfer of the control node role among the plurality of devices of the control cluster;
   storing the schedule in memory of the first device; and
   communicating the schedule to each of the plurality of devices of the control cluster for storage.

5. The method of claim 4, further comprising:
   collaborating with one or more of the plurality devices of the control cluster to identify a sequence of the control node role allocation, wherein the first device is a member of the control cluster, and wherein at least two of the plurality of devices of the control cluster are identified in the schedule stored on the first device.

6. The method of claim 4, wherein the plurality of attributes includes at least one attribute related to suitability for serving in the control cluster selected from:
   a battery level;
   an expected battery life;
   a proximity to other devices of the cluster;
   a transceiver battery usage; or
   an operating power mode.

7. The method of claim 4, further comprising:
   receiving one or more consensus inputs from the plurality of devices of the control cluster to define the schedule, the one or more consensus inputs relating to an order of transferring the control node role in the control cluster.

8. The method of claim 4, further comprising:
   transmitting, from the first device, a plurality of attributes to other devices in the control cluster.

9. A device, comprising:
   a Bluetooth transceiver;
   a memory; and
   a processor coupled to the Bluetooth transceiver and the memory, and configured to:
     identify a control node assumption timing in a schedule stored in the memory, the control node assumption timing defining when the device is scheduled to assume a control node role for a wireless mesh network from a second device in a control cluster of the mesh network;
     assume the control node role for the wireless mesh network based on the control node assumption timing in the schedule, the control node role including transmitting periodic messages to support the wireless mesh network;
     identify a control node role end timing in the schedule stored in the memory;
     identify a third device in the control cluster that will assume the control node role based on the schedule;
     monitor for an extended advertisement from the third device after the control node role end timing, wherein receiving an extended advertisement indicates that the third device has assumed the control node role;
     transmit the periodic messages after the control node role end timing until the extended advertisement from the third device is received; and
     assume a passive node role of listening for periodic messages from the third device after the control node role end timing upon receiving the extended advertisement from the third device; or
     continue the control node role when no extended advertisement is received from the third device.

10. The device of claim 9, wherein the processor is further configured to continue the control node role when no extended advertisement is received from the third device by:
    identifying a fourth device in the control cluster that will assume the control node role based on the schedule;
    adjusting the schedule to shift the control node assumption timing of the fourth device;
    requesting a premature transfer of the control node role;
    receiving an acknowledgement from the fourth device of the shift in the control node assumption timing;

monitoring for a periodic advertisement from the fourth device after the acknowledgment indicating that the fourth device has assumed the control node role; and assuming the control node role of listening for periodic messages from the third device after the control node role end timing upon receiving the periodic advertisement from the fourth device.

11. The device of claim 9, wherein the processor is further configured to continue the control node role when no extended advertisement is received from the third device by:

continuing in the control node role until the schedule provides another device of the control cluster to assume the control node role.

12. The device of claim 9, wherein the processor is further configured to:

receive a plurality of attributes from devices during organization of the mesh network;

identify a plurality of devices within the mesh network suitable for the control cluster based on the received plurality of attributes;

compile the schedule for transfer of the control node role among the plurality of devices of the control cluster;

store the schedule in the memory; and communicate the schedule to each of the devices of the control cluster for storage.

13. The device of claim 12, wherein the processor is further configured to:

collaborate with one or more of the plurality of devices of the control cluster to identify a sequence of the control node role allocation, wherein at least two of the devices of the control cluster are identified in the schedule stored in the memory.

14. The device of claim 12, wherein the plurality of attributes includes at least one attribute related to suitability for serving in the control cluster selected from:

a battery level;
an expected battery life;
a proximity to other devices of the cluster;
a transceiver battery usage; or
an operating power mode.

15. The device of claim 12, wherein the processor is further configured to:

receive one or more consensus inputs from the plurality of devices of the control cluster to define the schedule, the one or more consensus inputs relating to an order of transferring the control node role in the control cluster.

16. The device of claim 12, wherein the processor is further configured to:

transmit a plurality of attributes to other devices in the control cluster.

17. A non-transitory processor-readable medium having stored thereon processor-executable instructions configured to cause a processor of a device for use in a wireless mesh network to perform operations comprising:

identifying a control node assumption timing in a schedule stored in memory, the control node assumption timing defining when the device is scheduled to assume a control node role for the wireless mesh network from a second device in a control cluster of the mesh network; and assuming the control node role for the wireless mesh network based on the control node assumption timing in the schedule, the control node role including transmitting periodic messages to support the wireless mesh network;

identifying a control node role end timing in the schedule stored on the first device;

identifying a third device in the control cluster that will assume the control node role based on the schedule;

monitoring for an extended advertisement from the third device after the control node role end timing indicating that the third device has assumed the control node role;

transmitting the periodic messages after the control node role end timing until the extended advertisement from the third device is received; and assuming a passive node role of listening for periodic messages from the third device after the control node role end timing upon receiving the extended advertisement from the third device; or continuing the control node role when no extended advertisement is received from the third device.

* * * * *